United States Patent [19]

Snekkenes

[11] Patent Number: 4,837,973
[45] Date of Patent: Jun. 13, 1989

[54] WATERING SYSTEM FOR AREAS FOR THE GROWTH OF PLANTS

[76] Inventor: Torbjörn A. Snekkenes, Brunla, 3290 Stavern, Norway

[21] Appl. No.: 32,948

[22] Filed: Mar. 30, 1987

Related U.S. Application Data

[63] Continuation of Ser. No. 708,656, Mar. 6, 1985, abandoned.

[30] Foreign Application Priority Data

Mar. 8, 1984 [NO] Norway ............................. 840884

[51] Int. Cl.⁴ .................. A01G 25/00; A01G 27/00; E02B 11/00
[52] U.S. Cl. ........................................ 47/81; 47/62; 405/36
[58] Field of Search ................................. 47/59–65, 47/79–81, 18, 19, 48.5, 39; 405/38, 50, 36

[56] References Cited

U.S. PATENT DOCUMENTS

| | | | |
|---|---|---|---|
| 1,222,648 | 4/1917 | Marks | 47/18 |
| 2,022,398 | 12/1931 | Beyer | 47/18 |
| 2,223,360 | 12/1940 | Ellis | 47/79 |
| 2,639,549 | 5/1953 | Wubben et al. | 47/62 |
| 2,803,091 | 8/1957 | Radford | 47/18 X |
| 3,305,968 | 2/1967 | Dosedla et al. | 47/1.2 |
| 3,772,827 | 11/1973 | Ware | 47/62 X |
| 3,888,041 | 6/1975 | Seith et al. | 47/9 |
| 4,001,968 | 1/1977 | Green . | |
| 4,156,324 | 5/1979 | Henttonen | 47/48.5 |
| 4,211,037 | 7/1980 | Green | 47/62 X |
| 4,222,199 | 9/1980 | Kehl | 47/59 |
| 4,231,188 | 11/1980 | McGuire et al. | 47/59 X |
| 4,246,305 | 1/1981 | Delattre | 405/50 |
| 4,285,164 | 8/1981 | Moore | 47/81 X |
| 4,291,499 | 9/1981 | Prewer | 47/59 |

FOREIGN PATENT DOCUMENTS

| | | | |
|---|---|---|---|
| 146458 | 8/1950 | Australia . | |
| 146458 | 5/1952 | Australia | 47/64 |
| EP80003 | 1/1982 | European Pat. Off. | 47/79 |
| 103342 | 3/1984 | European Pat. Off. | 47/59 |
| 2045516 | 3/1972 | Fed. Rep. of Germany | 47/64 |
| 2143149 | 3/1973 | Fed. Rep. of Germany | 47/79 |
| 2158366 | 3/1973 | Fed. Rep. of Germany | 47/80 |
| 2310458 | 9/1974 | Fed. Rep. of Germany | 47/79 |
| 2065768 | 8/1975 | Fed. Rep. of Germany . | |
| 2812324 | 9/1979 | Fed. Rep. of Germany | 47/18 |
| 2936271 | 3/1980 | Fed. Rep. of Germany . | |
| 7935440 | 3/1980 | Fed. Rep. of Germany . | |
| 2850764 | 3/1982 | Fed. Rep. of Germany . | |
| 3118226 | 11/1982 | Fed. Rep. of Germany . | |
| 1414605 | 9/1965 | France | 47/80 |
| 2341263 | 2/1976 | France . | |
| 7535815 | 6/1977 | France . | |
| 7605154 | 9/1977 | France . | |
| 2394242 | 2/1979 | France | 47/80 |
| 8105726 | 7/1983 | Netherlands | 47/59 |
| 2113518 | 8/1983 | United Kingdom | 47/64 |

Primary Examiner—Danton D. DeMille
Attorney, Agent, or Firm—Scully, Scott, Murphy & Presser

[57] ABSTRACT

A watering system for areas for the growth of plants with the water being supplied from below with respect to the plants to be grown comprises an area for the growth of the plants which comprises a watertight backing upon which a watering mat has been placed. The watertight backing comprises a waterproof channel element sheet (3) having hollow parallel channels separated from one another by partition walls. At its face in contact with the watering mat (5) the channel element sheet is provided with microfessures or microholes (4) which penetrate into the separate channels enabling water supplied at one of the transverse open ends of the channel element sheet (3) to be sucked into the channels and from there up through the microfissures or microholes (4) and into the superposed watering mat (5). The channel element sheet (3) preferably consists of polypropylene plastics pigmented black, and the watering mat (5) preferably consists of a conventional glass fiber mat of randomly oriented fibers.

7 Claims, 2 Drawing Sheets

WATERING SYSTEM FOR AREAS FOR THE GROWTH OF PLANTS

This application is a continuation of application of Ser. No. 708,656, filed Mar. 6, 1985 now abandoned.

FIELD OF THE INVENTION

The present invention relates to a system for irrigation of areas for growing plants, the water being supplied from below with respect to the plants to be grown.

THE PROIR ART

When growing plants on large growing areas it is a problem to simultaneously obtain a uniform irrigation of the plants. Outdoors the irrigation is mostly performed by means of comprehensive watering plants with pipe systems and sprinklers, and the sprinklers must from time to time be moved when a region of the growing area has been sufficiently irrigated whereas other regions have a moisture deficit. Thus, it is a time consuming work which demands careful surveillance to provide for the proper irrigation of the entire growing area.

There are also large growing areas, e.g. growing tables or growing benches, both outdoors and in greenhouses which are irrigated from below, i.e. beneath the plants to be grown or the seeds which are to germinate. Such systems are disclosed inter alia in U.S. Pats. Nos. 1,222,648, 2,022,398, 3,305,968 and 4,156,324 and in West-German Published Patent Application 2065789.

U.S. Pat. No. 1,222,648 discloses a self-watering growing trough or bench. The water level in the trough or bench is to be raised or lowered in order to control the moisture content in the soil placed upon the trough or bench. According to FIG. 1 of U.S. Patent No. 1,222,648 a container consists of cement or concrete. The container is proveded with a water inlet at one of its ends. Near one end of the container this is provided with several water outlets. The container is provided with a false bottom above the water level and below its upper edge for supporting soil thereon. The false bottom consists of a plurality of porous tiles with flat top surfaces, the lower side of the tile being narrower than the top side and, consequently, its lateral faces are inclined. The bottom faces of the tiles are hollowed out forming a hollow space below the top surfaces, the hollow space being open at its bottom. The hollow space has a larger depth than the depth of water in the trough or in the bench whereby an airspace is formed above the water level. Water is sucked up into the soil placed upon the tile surfaces by means of capillary action through pores in the tile from legs thereof immersed in water. The tiles may also be provided with perforations extending from the top surface vertically down through the tile in order to make it possible for mosisture and air to pass through the perforations to the roots of the plants.

U.S. Pat. No. 2,022,398 relates to a greenhouse bench of burnt, porous clay which absorbs moisture. The greenhouse bench consists of sections of hollow tiles with upper and lower plates interconnected by means of partition walls, forming hollow channels. The porous tiles absorb moisture and then give the same up as a nebulous mist to the atmosphere.

U.S. Pat. No. 3,305,968 discloses growing chests with a water tight bottom and with growing trays suspended from the upper side walls of the chest and across the length of the chest. The trays are provided with holes and, accordingly, are present in the form of a grid. Absorbing pads of growth medium are placed upon the grid, and between the grid and the bottom of the growing chest water has been filled so that the growth pads of absorbing material, e.g. cotton, when resting upon the tray will be capable of sucking up water which has been filled up to a level substantially the same as the underside of the tray.

U.S. Pat. No. 4,156,324 discloses a method and apparatus for the artificial irrigation of plants and flower beds, garden plots, plant containers, and the like, whether indoors or outdoors. The apparatus comprises a plurality of irrigation containers which at spaced locations and at desired depths are submersed in soil in the area which is to be irrigated. Each container comprises at least one hollow element extending through the top wall of the container and into the container and acts as a foot or wick for sucking water up from the container. To this end the hollow elements has a perforated bottom. The container is filled with water to a such level that at least the lower part of the hollow element is immersed in the water. Each hollow element is filled with soil, and soil is provided over and around the irrigation containers so that the containers are entirely covered by the soil. The top of each container is provided with a plurality of perforations sufficiently small to avoid soil particles falling down through the perforations. As mentioned, the mass of soil in the hollow element sucks up water to the overlying soil, and vapor raises up through the perforated top wall of the container or the top wall of the container allows water to sink down into the container. The container may be made of a piece of pipe which is closed at both ends. The upper portion of the pipe is formed with transversal slots covering an upper sector of the pipe. The pipe-type irrigation container may also consist of a corrugated pipe in order to make it possible to bow the container upon need.

According to the Published West German Patent Application No. 2065768, pots are placed in a growing chest, and the pots are spaced from the bottom of the growing chest by means of bosses extending from the bottom of the chest and on which the pots rest. At their lower part and for a certain distance upwardly along their walls the pots are provided with holes, and water is filled into the growing chest till a level slightly up along the walls of the pots, whereby water will be sucked up into the pots through the holes.

In West German Published Patent Application No. 2850764 there is disclosed a circulation system for irrigation of plant pots with the pots resting on a growing table having an inclined surface which preferably is covered by a watering or irrigation mat. The surface may be downwardly inclined from the middle towards the sides, it may be downwardly inclined from one side towards the other or it may be downwardly inclined from both sides towards the middle of the growing table. A constant, liquid film of water is to be maintained on the inclined surface. As mentioned, the surface is preferably covered with a watering mat which is to provide uniform distribution of water supplied to the surface. Water is fed to the watering mat from the middle thereof so that the mat will take up water and transport the water towards both sides of the growing table, or water is fed to the mat from its elevated side so that a film of water will be formed on the mat and flow towards the opposite lower side. If the surface falls from both sides towards the middle, water is supplied along the two sides of the mat forming a film of water which flows downwardly towards the middle. Excess water is collected in chutes by letting the mats dip down into the chuted or by letting the mat cover the chutes while suction is formed in the chute beneath the mat. Plant pots placed on the watering mat are provided with holes in their bottom enabling water to be sucked up into the pots. However, the use of inclined surfaces provided with a covering water mat has various disadvantages as far as the obtainment of uniform distribution of the water is concerned, and according to West German Patent Application No. 2850764 this problem is solved thereby that the water flow direction on the inclined surface is choosen so that the flow path becomes short, preferably 2 meters or shorter.

With other known circulation methods for irrigation of large greenhouse tables covered by a watering mat the tables must be inclined downwards in their elongate dircetion and they must be exactly horizontal in the transverse direction. In order to irrigate all pots resting on the growing surface a water film must be formed over the entire width of the table and for a shorter period of time also over the entire length of the table. In order to achieve this large amount of water this must be supplied at the beginning of the table, or several water outlet openings must be used which are distributed over the entire upper surface of the table. In both cases a film of water is formed which has areas with raised water levels, and the uniformity of the film of water cannot be controlled.

Due to the width and length of such growing tables irregularities often occur on the upper surface thereof, and the water will either not reach these irregularities or the water will remain stagnant in these irregularities. This may be due to deficient construction of the tables, sinking of the base thereof or distortions of materials etc. For that reason the roots of some plants in the pots will not be moistened or only porely moistened whereas others will become too strongly moistened so that a bottom sludge may be formed in the pots with consequential damage to the plant roots.

It is known on growing tables provided with irrigation systems of the latter type to use thick watering mats in order to obtain a somewhat satisfactory distribution of the water. However, even the use of thick watering mats will not alleviate the above-mentioned deficiencies. Within areas saturated with water no capillary force will be created in the watering mats, and within other areas the capillary force will not be sufficient to suck water out from possible recesses and supply water to dry places to such an extent that uniform irrigation of the entire growing surface will be obtained. In order to avoid that water will remain stagnant in recesses in the growing surface, the latter has been arranged at an inclination according to the mentioned West German Patent Application No. 2850764. However, this arrangement is condusive to several disadvantages. The production of the growing tables becomes more cumbersome, the gardening work as such becomes more inconvenient, the plants will grow obliquely with respect to the horizontal and the water will flow strongly inclination oriented and, thus, may not reach the more elevated areas of the growing surface.

Systems are also known where growing surfaces are covered with a watering mat and with the water being supplied from above so distributed across the surface of the growing area that a near uniform distribution of water will be obtained in the watering mat. Irrigation tubes or pipes must then be arranged distributed in accordance with a suitable pattern across the growing surface, however, nevertheless the water which falls down onto the watering mat from the irrigation tubes will not be sufficiently uniformly distributed to enable a satisfactory result to be obtained. Moreover, it is costly and work hindering to have such systems of water distributing tubes arranged above the growing surfaces.

OBJECT OF THE INVENTION

It is the object of the present invention to avoid the above-mentioned deficiencies connected with the known watering of large growing areas, by providing a watering or irrigation system which functions perfectly also for horizontal growing areas and yields a very rapid and uniform distribution of the water over the entire growing area.

DISCLOSURE OF THE INVENTION

The invention provides a watering system for areas for the growth of plants, the water being supplied from below with respect to the plants to be grown, the area for the growth of the plants comprising a watertight backing upon which a watering mat has been placed, the improvement wherein the watertight backing comprises a waterproof channel element sheet having hollow parallel channels separated from one another by partition walls, the channel element sheet at its face in contact with the watering mat being provided with microfissures or microholes which penetrate into the separate channels enabling water supplied at one of the transverse open ends of the channel element sheet to be sucked into the channels and from there up through the microfissures or microholes and into the supperposed watering mat.

BRIEF DESCRIPTION OF THE DRAWING

By way of example only, the invention is described below with reference to the accompanying drawing wherein.

DETAILED DESCRIPTION OF THE INVENTION AND OF THE DRAWINGS

Figure 1:
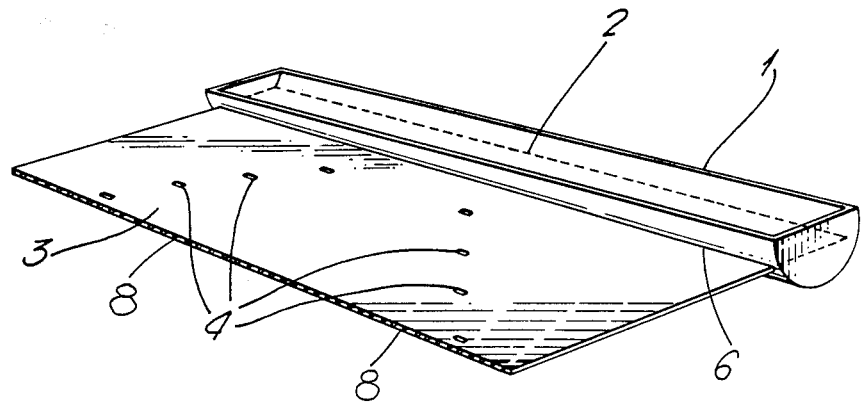
FIG. 1 is a schematic representation of a channel element sheet with associated water chute for the supply of water into the separate channels of the channel element sheet of the watering system according to the invention.

For the watering system according to the application any channel element sheet of sufficient water resistance so as not to be degraded by the influence of water can be used, and as examples of such materials channel element sheets of polypropylene, polyethylene, polyacrylics or water resistant card board or fiber board may be used.

The watering mat of the watering system according to the invention is made of a water resistant material, the mat being able to suck up water. The mat may have thickness varying from 0.1 mm and up to 10 mm and may consist of sucking paper mats, polymer fiber mats or mats of other water resistant fibers. However, preferably a conventional glass fiber mat of fibers of random orientation is used because it has been found that a such mat will not only momentarily suck up water but it is also very water resistant and very easy to clean if moist soil or earth should be deposited upon the mat and tend to obstruct the pores therein. In order to avoid growth of fungi in the humid environment the watering mat should preferably be pigmented black.

The microfissures or the microopenings in the surface of the channel element sheet which is to face the watering mat may easiliy be made by simply using a thin-bladed knife, e.g. of razor blade thickness or a Stanley knife or a similar scribing tool, and apply this against the mentioned surface of the channel element sheet in order to form small fissures, slots or holes spaced from one another through the mentioned surface of the channel element sheet and down into the subjacent channels for thereby forming communication between these channels and the surface of the sheet. It is equally possible to penetrate the upper surface of the channel element sheet by use of finely pointed needles. These microfissures or microholes may have any desired spacing from one another, and tests have been carried out with good result with the microfissures being parallel to one another and transverse with respect to the longitudinal direction of the channels or parallel with one another and at an angle with respect to the transverse direction of the channels and with the microfissures being mutually spaced apart at a distance varying from 2 to 40 cm.

The channel element sheet used in the watering system according to the invention has a certain self-supporting rigidity, and for that reason small irregularities in the surface of the support on which the sheet rests will not to any essential degree influence upon the planarity of the surface of the plate which faces the watering mat, and the well known disadvantage connected with recesses and regions of increased water level and too dry elevated tops or regions when a pliable watering mat is placed directly upon a solid support which may have or may develop irregularities will be avoided. However, it has been found that even on a such non-planar support that the channel element sheet also will have marked tops and bottoms at its surface facing the watering mat the channels will exert a sufficient capillary force to suck water into and completely fill the channels thereby avoiding the occurrence of dry elevated points or regions in the channnels from which water may not be sucked up through the microfissures or the microopenings in the surface of the sheet. If the cross-sectional area of the channels is so large that sucking in of water due to capillary forces will not take place, a so called water vein effect will occur, i.e. a film of air will be formed above the water in the channel and prevent the water from being sucked up through the microfissures or the microholes. It has not been unequivocally established exactly what the limiting cross-sectional area is for the change from the suction into the channels due to capillary forces to the so called water vein effect, however, own tests have shown that this change seems to occur at a cross-sectional area for the channels of about 36 mm$^2$. The lower limit of the cross-sectional area of the channels will only be dependent upon the production technology used for the production of the channel element plates.

Moreover, the cross-sectional shape of the channel is of minor importance, and the cross-sectional area may be square, rectangular, trapezoidal, elliptical or circular. Further, the watering mats laid upon the channel element sheet must, of course, be capable of sucking up water from their underside.

Figure 2:
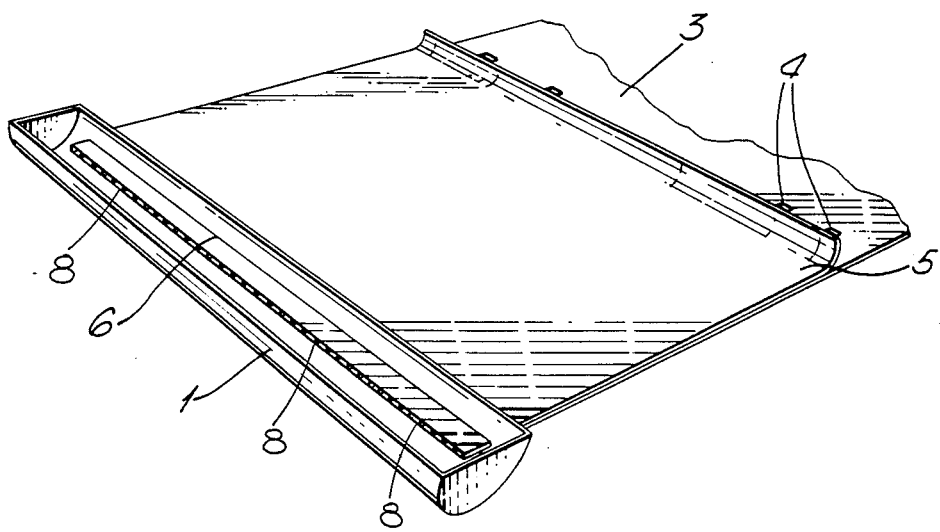
FIG. 2 is a schematic representation of a shortened length of the channel element sheet, a water chute at one of the transverse ends of the channel element sheet and a watering mat laid upon the channel element sheet to form a watering system according to the invention.
Figure 3:
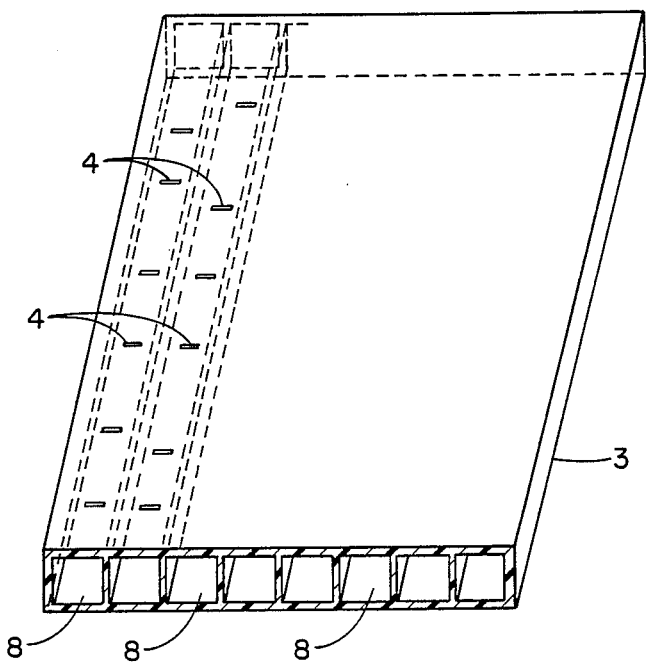
FIG. 3 illustrates, on an enlarged scale, a perspective view of the channel element sheet.
Figure 4:
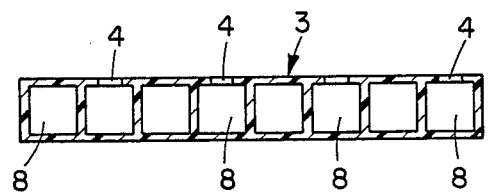
FIG. 4 illustrates a sectional view taken along line 4—4 in FIG. 3.
Figure 5:
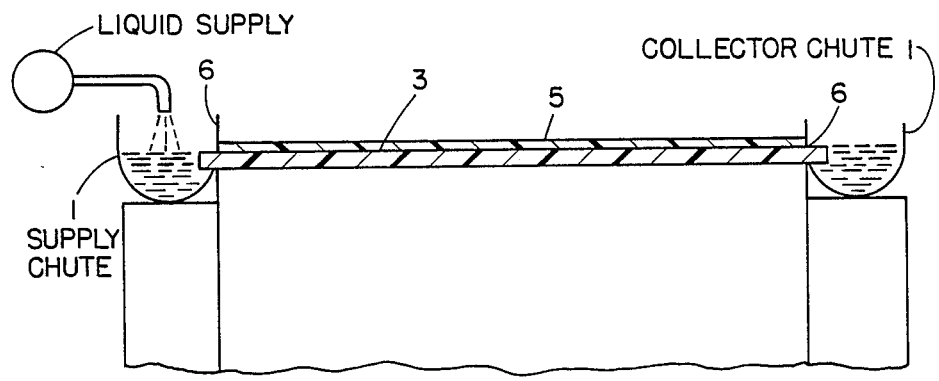
FIG. 5 illustrates a generally diagrammatic end view of a watering system pursuant to the invention.

The invention has been shown by way of example only on the accompanying drawings which comprises FIGS. 1 through 5 which show the essential elements for building up the watering system according to the invention. Thus, FIG. 1 shows a collecting chute for nourishing liquid (water) 1 with the minimum water level 2 therein indicated by means of dotted lines. When using the system this minimum water level is to be such that the water reaches to just above the upper edge of the channel opening at the place where the channel element sheet 3 has been inserted through conformingly dimensioned opening in the one elongate side wall of the collecting chute for the nourishing liquid facing the channels in the channel element sheet 3, as shown at 6 in FIGS. 1, 2 and 5. In condsideration of space, only a shorter length of the channel element plate 3 has been shown in FIG. 1, however, it will be understood that at each transverse end of the channel element sheet 3 a such water chute 1 will be connected to the channel element sheet 3, as shown in FIG. 5. FIGS. 1 and 3 also shown microfissures 4 in the upper surface portion of sheet 3, and it appears in from FIGS. 1 and 2 that these microfissures may be staggered and that they do not have to penetrate into all channels 8 of channel element sheet. The pattern of distribution of the microfissures may be varied as also shown in FIG. 3, in accordance with the pertaining watering requirement which in turn will be dependent upon such variables as the distribution of e.g. growth pots on the growth surface, the loss of water vapor from the growth surface and the nourishing liquid demand of the plants to be grown, and it will be understood that the closer the microfissures or the microopenings are arranged in the upper surface of the channel sheet and the more channels into which the microfissures or the microopenings penetrate, the more nourishing liquid will at any time be at disposal in the watering mat 5 FIGS. 2 and 5 which has been laid upon the channel element sheet 3. In order to retain a temporary excess of nourishing liquid which has been sucked up into the watering mat, e.g. when replacing plant pots from the growth surface thereby causing a temporarily reduced watering requirement, it hmay be preferable to provide small ridges, e.g. having a height of from 1 to 2 cm, along the elongate sides of the channel element plate, e.g. by slightly bending these sides up or by providing these sides with a low separately affixed edge, e.g. having a height of 1-2 cm, in order to prevent a temporary excess of nourishing liquid to flow off from the growth surface and beyond the elongate sides of the channel element sheet.

FIG. 2 shows a broken off length of the channel element sheet 3 with a watering mat 5 placed thereupon, the watering mat having been folded up and back over itself to show the subjacent channel element sheet 3 and the microfissures 4 therein. The channel element sheet has at one of its transverse ends been sealingly inserted at 6 through the adjacent elongate side wall of a nourishing liquid chute (water chute) 1.

It is a substantial advantage of the watering system according to the invention that nourishing liquid only has to be supplied in the nourishing liquid chute 1 at one of the transverse ends of the channel sheet and not as for some known systems by means of a complex tube system in order to supply nourishing liquid to the growth surface at several points above the growth surface. When using the watering system according to the invention care must only be taken that the level of nourishing liquid in the chute 1 completely covers the openings into the channels of the channel element sheet so as to avoid the formation of an air film above the water in the channels because a such air film would prevent the efficient and rapid distribution of water over the entire growth surface by being sucked up from the channels and through the superposed watering mat.

FIGS. 2 and 5 show that the channel element sheet 3 is in communication with a suitable chute 1 for nourishing liquid 2 (water). Further, the chute 1 has been shown as a chute which is open at its top. However, it will be understood that the chute 1 may be closed at its top or replaced by another means closed at the top for the supply of nourishing liquid. A such means may consist of a tube of cylindrical or other cross-section, and nourishing liquid will then be introduced from the end or the ends of the means, or the means may be provided with openings for the supply of water or nourishing liquid at other places so that the minimum required level 2 of liquid (FIG. 1) will be maintained, i.e. so that the liquid will at least substantially completely cover the openings to the channels of the channel element sheet 3. When several units of channel element sheet/watering mat are arranged side by side it will also be understood that the same supply means, e.g. a common tube, for nourishing liquid may be used for all units. Nourishing liquid may then most conveniently be supplied to the common tube from a central common unit, preferably by means of a float system in order to obtain controlled liquid level in the common tube. This common tube will then be provided with mutually spaced elongated slots having a height and a width enabling the transverse end of each channel element sheet, through which nourishing liquid is to be introduced into the hollow channels therein, to be sealingly and separately inserted into the elongate slot so that the openings of the hollow channels at the introduced transverse end of the channel element sheet will communicate with the nourishing liquid in the common tube. A such arrangement with several units of channel element sheet/watering mat being provided with nourishing liquid from a common supply system is particularly suited for such systems for the growing of crops where the units are placed directly on a continuous support, e.g. directly on the ground, without separating walls between the units. By means of such system the growing of plants or crops may be carried out at places on the earth having a deficient amount of rainfall, e.g. in desert regions, the growth medium, e.g. soil, being placed with the necessary layer thickness upon each watering mat, or so called plant trays being placed upon each watering mat, and such plant trays will then, as known per se, be provided with through openings in its surface for the insertion therein of e.g. a plant pot which has been filled with the growth medium and provided with hole or holes in its bottom for sucking up nourishing liquid from the watering mat, or the plant tray may in a manner known per se be provided with depressions leading downwardly from the surface of the plant tray, and these depressions will then rest on the watering mat and be provided with hole or holes in their bottom for sucking up nourishing liquid into the depressions which may contain an inserted plant pot filled with growth medium and also with holes in their bottom, or the depressions may simply be filled with the growth medium for insertion therein of plants to be grown or seeds for germination.

For operating a such plant or system for the growing of crops using an engine driven vehicle, e.g. a tractor, separate units of channel element sheet/watering mat may be arranged in parallel relationship and so spaced from one another that the vehicle may be driven between two neighouring units, or the distance between two neighbouring units may be such that there will only be sufficient room between the units for the wheels on either side of the vehicle. It will be understood that in the latter case one of two neighbouring units will be below the vehicle between the right and left wheels of the vehicle when the vehicle is used for oparating the plant. In order that the vehicle may be driven back and forth between the units without being hindered by the transversely arranged common water supplying tube or tubes (manifold tube), the extensions of the latter between neighboring units latter will be placed below ground level and covered with a supporting material which will endure the compression exerted by the wheels of the vehicle thereby preventing deformation of the manifold tube connection between neighbouring units.

BEST MODE FOR CARRYING OUT THE INVENTION

The watering system according to the application has been tested for large growth tables each having a horizontal growth surface of $1.2 \text{ m} \times 10.0 \text{ m} = 12 \text{ m}^2$, and the channel element sheet was placed upon the growth surface of the growth table so as to completely cover the growth surface and so that the channels of the channel element sheet run parallel to and in the same direction as the length of the growth table. At each transverse end of the growth table a water chute was arranged so that the channels of the channel element sheet was in open communication with the water in the water chutes. On the channel element sheet the surface of which was provided with parallel transverse microfissures spaced apart with a distance of 10 cm a dry, conventional watering mat of felted glass fibers and having a thickness of 0.5 mm was placed, and when water was filled into the water chute at one of the transverse ends of the growth tables, the water was very rapidly sucked into the channels of the channel element sheet and from these up through the microfissures and into the superposed watering mat wherein the water became uniformly distributed providing a watering mat of uniform moisture content over its entire surface.

The time from water was supplied to the one water chute at one of the transverse ends of the growth table and until the dry watering mat had uniformly absorbed water over its entire area, i.e. $1.2 \times 10.0 \text{ m} = 12 \text{ m}^2$, was about 60 seconds, and it was remarkable that the moisture content throughout the watering mat kept constant all the time as long as water was present in the water chute up to a level which was insignificantly higher than the level of the upper edge of the hollow channels of the channel element sheet.

Plant pots provided with holes in their bottoms and charged with dry soil as growth medium were uniformly distributed across the watering mat so that the plant pots nearly touched one another, and samples taken from the soil in the plant pots after a contact time of 15 minutes with the watering mat showed that the soil had approximately the same moisture content in all plant pots.

The channel element sheet used for this experiment was a channel element sheet of the type which is conventionally used for packaging purposes and consisted of polypropylene plastics pigmented black and having channels with an internal width of 4 mm and an internal height of 4 mm. The channel element sheets per se had a thickness of 5 mm, i.e. that at their top and at their bottom the channels were covered by a sheet having a thickness of about 0.5 mm, the channels being separated from one another by means of parallel partition walls also having a thickness of about 0.5 mm. Such plastics sheets having parallel and hollow channels ("corrugated plastics sheets") are commercially available and are unitary, i.e. made in one piece, and one such commercially available channel element sheet is marketed in Norway under the trade name "Pol-papp".

As stated above, the microfissures or the microholes from the top surface of the channel element sheet into the subjacent hollow channels therein may be spaced apart at any desirable distance and in accordance with a distribution pattern dependent upon the pertaining watering requirement. However, practice has shown that in order to obtain as rapidly as possible a substantially completely uniform distribution of moisture in the watering mat when starting from a dry watering mat such microfissures ought to run parallel to one another and transversely of the longitudinal direction of the hollow subjacent channels and spaced apart at a distance not above 20 cm, e.g. between 5 and 20 cm.

I claim:

1. In a watering system for areas for the growth of plants in which water is supplied from below with respect to the plants, the area for the growth of the plants comprising a backing structure consisting of a substantially planar channel element sheet of water impervious material having a plurality of hollow parallel tubular channels extending therethrough which are open at their opposite longitudinal ends and closed at the tops and the bottoms thereof and being separated from each other through longitudinal partition walls so as to prevent fluid communication between the channels, a water supply source at one end of the element sheet communicating with said channels for supplying water to each of said channels so as to fully maintain said channels filled with water, said channel element sheet having microapertures extending through the upper wall thereof penetrating into at least some of the separate channels of said channel element sheet enabling water supplied from said water supply source to said channels to flow upwardly through the microapertures, the improvement wherein a watering mat is positioned on the upper surface of said channel element sheet, the lower surface of said watering mat being in contact with the upper ends of each of said microapertures, the cross-sectional area of each said separate channel being not above about 16 mm$^2$ in order to cause water supplied at one end of the channel element sheet to be continually sucked into the channels by capillary action without the need for hydrostatic pressure upwardly through said microapertures from the channels responsive to capillary forces imparted thereto by said watering mat on the upper surface of the channel elemet sheet.

2. A watering system as claimed in claim 1, wherein the channel element sheet is made of black-pigmented polypropylene plastics.

3. A watering system as claimed in claim 1, wherein the watering mat consists of a glass fiber mat of randomly oriented fibers.

4. A watering system as claimed in claim 3, wherein the glass fiber mat is pigmented black.

5. A watering system as claimed in claim 1, wherein said microapertures comprise microfissures.

6. A watering system as claimed in claim 5, wherein the surface of the channel element sheet which faces the watering mat includes a plurality of parallel rows of said microfissures spaced apart of from 5 to 20 cm and extending transversely of the longitudinal direction of the channels in said sheet.

7. A watering system as claimed in claim 1, wherein said microapertures comprises microholes.

* * * * *